Oct. 31, 1939.  P. H. STAAFF  2,178,409
CENTRIFUGAL SEPARATOR
Filed Sept. 9, 1937
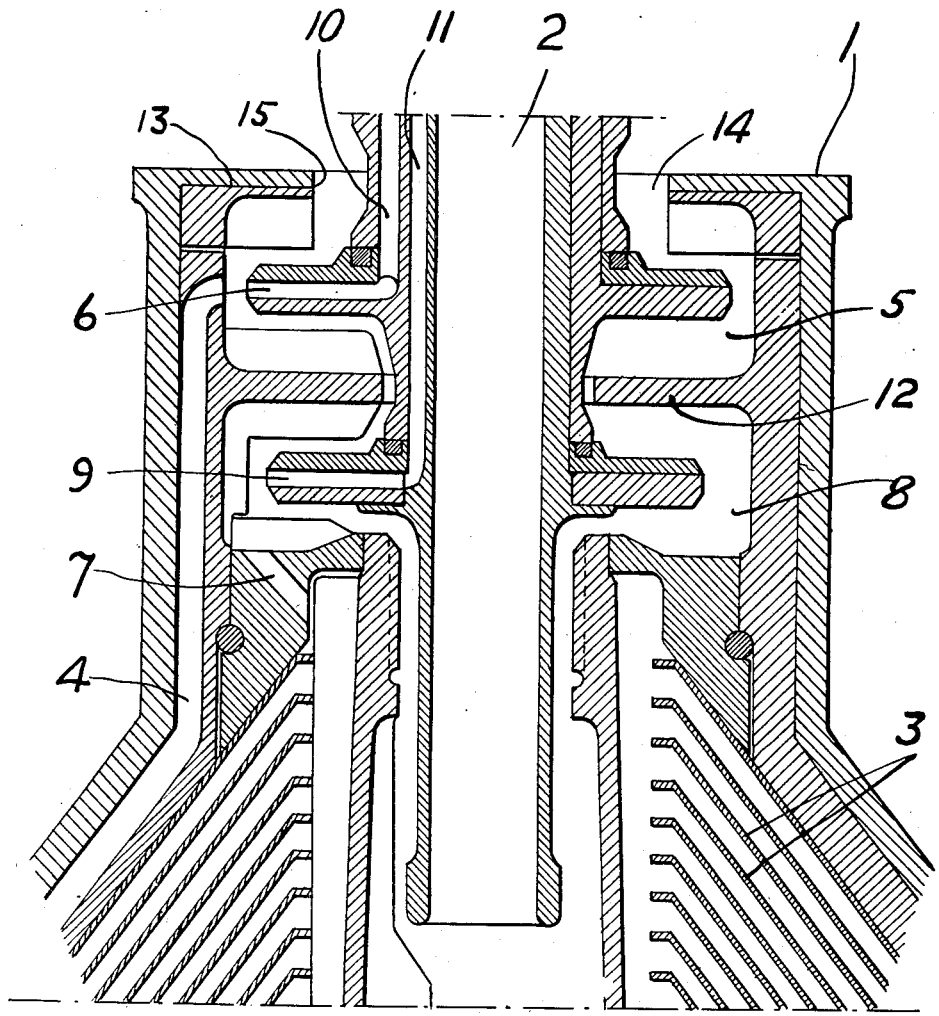
WITNESS:
INVENTOR
Per Hilding Staaff
BY
ATTORNEYS.

Patented Oct. 31, 1939

2,178,409

UNITED STATES PATENT OFFICE 2,178,409

CENTRIFUGAL SEPARATOR

Per Hilding Staaff, Alsten, Sweden, assignor to The De Laval Separator Company, New York, N. Y., a corporation of New Jersey Application September 9, 1937, Serial No. 162,979
In Sweden November 7, 1936

3 Claims. (Cl. 233—22)

This invention relates to improvements in centrifugal separators and particularly to those which are provided with paring devices for discharging one or both of two liquids from the bowl.

In centrifugal separators which are provided with devices for discharging skim-milk, or both skim-milk and cream, by paring members which are positioned close to each other, there is a certain risk that cream may penetrate into the chamber in which the paring member for skim-milk is located.

Experience has shown that an inner layer of froth is formed in the chambers for cream and skim-milk, which layer is displaced inwardly of the level of liquid which would be formed if the liquid were allowed to discharge freely from the bowl. For this reason there is a risk that cream froth may leak out of the chamber for cream and get up into the chamber for skim-milk. In order to prevent this, bowls of this type have been provided, between the chambers for cream and skim-milk, with a collecting groove having an outwardly opening orifice. Any cream or skim-milk escaping from their respective chambers is caught in this groove and conducted to a collecting vessel located outside the bowl. This arrangement, however, has the inconvenience that a collecting vessel which has no other purpose must be provided especially for receiving the liquid leaking out.

The present invention relates to an arrangement by which a full safeguard against cream leaking over to the skim-milk is obtained without a special collecting vessel for the cream being required. The invention is characterized by the provision in the top of the bowl above the skim-milk chamber of an outlet for liquid of such a construction that skim-milk discharges therefrom before the cream level or the skim-milk level can move so far towards the center that the cream can pass from the cream chamber to the skim-milk chamber.

In connection with the accompanying drawing, the arrangement will be more closely described.

In the single figure, which is a sectional view through the top of a separator bowl, 1 is the outer wall of the bowl neck, 2 is a central tube through which the whole milk is supplied, 3 is a series of discs in which the separation takes place, 4 is a channel which conducts the skim-milk from the periphery to the chamber 5 in which a paring device 6 is positioned. The cream is conducted to the central part of the bowl through openings 7 in a wall to a chamber 8 in which the paring device 9 for cream is positioned. The channels 6 and 9 communicate with the discharge pipes by channel systems 10 and 11, which are concentrically located around the inlet tube 2 for whole milk. Between the two chambers a separating wall 12 is arranged, which is provided with a central hole, the diameter of which is determined by the clearance between the hole and the stationary system which extends through it, which clearance should be enough to avoid striking during acceleration or at times when the bowl goes out of balance because of uneven loading. The cover 13 of the skim-milk chamber 5 is provided with a central opening 14, the edge or lip 15 of which is positioned, as hereinafter described, at such a radial distance from the bowl axis that skim-milk will flow over the lip 15 before the level of the cream in chamber 8 can move so far inwardly that cream can leak over the separating wall 12.

In a separator bowl of the type which was previously in general use and in which the skim-milk and the cream were discharged through openings into collecting vessels placed outside it, three levels of liquids can be distinguished. Firstly, there is an outer skim-milk level which is determined by the location and dimensions of the skim-milk outlet. This level substantially determines the level of the whole milk for between these levels there must be a drop of pressure sufficiently great to overcome the resistance to flow which exists in the bowl. Between these two levels there is the cream level, which is determined by the position and dimensions of the cream outlet. This outlet must be so arranged that the required amount of cream can be discharged. The bowl is generally provided with regulating devices, which are arranged either on the skim-milk or the cream chamber and which cause a displacement of the levels or a change of the dimensions or positions of the outlets. Of the levels mentioned above those for skim-milk and cream may be fixed rather accurately, but this is not the case as regards the level of the whole milk owing to the eddies which appear at the inlet of an open separator bowl when the milk flows freely into the bowl from a tube penetrating into the same.

In a bowl of the type shown in the figure there are also three levels, none of which, however, is accurately fixed owing to the effect of the paring discs. By adjusting the regulating valve in the outlet from one of the paring discs, the relation between the amounts of cream and skim-milk may be varied within certain limits.

If the cream space communicates freely with the cream chamber in the bowl, an increase of the counter-pressure on the cream causes a reduction in the quantity of cream, and a thicker cream is produced. An increase of the counter-pressure on the skim-milk causes an increase in the quantity of cream and results in thinner cream. If the pressure in the skim-milk pipe is increased, the skim-milk level and thus also the cream and whole milk levels are automatically displaced inwardly in the bowl. However, because the specific gravity of cream is less than that of skim-milk, the cream level is always nearer the center of the bowl than that of the skim-milk.

If now the opening in the wall separating the chambers and that in the cover on the skim-milk chamber have the same diameter, it is possible to displace the skim-milk level so far inwardly in the skim-milk chamber that cream froth can leak over the separating wall. There is, however, a diameter measure for the opening in the cover of the skim-milk chamber which does not permit the cream to flow into the chamber for skim-milk because, before this takes place, the skim-milk in this chamber leaks out of the bowl, so that the level of the cream in the cream chamber does not move beyond a given position.

Accordingly, in the present invention, the diameter of the opening 14 is so adjusted with respect to the counter-pressures obtaining that the skim-milk level in chamber 5 cannot be moved inwardly far enough to cause the cream in chamber 8 to leak past the wall 12.

What I claim and desire to protect by Letters Patent is:

1. In a centrifugal separator, the combination of two rotatable paring chambers, one for skim-milk and one for cream, positioned one above the other and separated by a partition wall having a centrally disposed opening therein, a feed tube extending through said chambers and passing through said opening, the opening being of substantially no greater diameter than that necessary to provide proper running clearance, stationary paring members supported from said feed tube and located in the respective chambers, and an emergency free outlet from the skim-milk chamber located at such substantially greater radial distance from the bowl axis than the opening in the partition wall that skim-milk will overflow therethrough before frothy cream can overflow from the cream chamber.

2. In a centrifugal separator, the combination of two rotatable paring chambers, the upper for skim-milk and the lower for cream, positioned one above the other and separated by a partition wall having a centrally disposed opening therein, a feed tube extending through said chambers and passing through said opening, the opening being of substantially no greater diameter than that necessary to provide proper running clearance, stationary paring members supported from said feed tube and located in the respective chambers, and a centrally disposed opening in the upper wall of the skim-milk chamber whose diameter is substantially greater than that necessary to provide proper running clearance as well as so substantially greater than that of the opening in the partition wall as to insure overflow of skim milk through the opening of greater diameter before frothy cream can overflow through the opening of smaller diameter from the cream chamber.

3. In a centrifugal separator provided with a rotatable paring chamber for skim-milk, a second rotatable paring chamber for cream located adjacent thereto and communicating therewith, and stationary paring members located in the respective chambers, the improvement comprising means forming an emergency free outlet for skim-milk from its paring chamber located at a radial distance from the axis of the bowl so far outside the radial distance from the axis of the bowl of the point of communication between said chambers that if the skim milk level reaches said emergency outlet and overflows thereout the pressure developable by the skim milk will be so much less than the pressure developable by the cream that no cream even in frothy condition can flow from the cream paring chamber to the skim milk paring chamber.

PER HILDING STAAFF.